United States Patent [19]

Evans

[11] Patent Number: 5,167,567
[45] Date of Patent: Dec. 1, 1992

[54] MECHANISM FOR CONTROL OF GATHERING PLATES FOR A DOUBLE CLIPPER APPARATUS

[75] Inventor: Alfred J. Evans, Raleigh, N.C.

[73] Assignee: Delaware Capital Formation, INc., Apex, N.C.

[21] Appl. No.: 839,010

[22] Filed: Feb. 14, 1992

Related U.S. Application Data

[63] Continuation of Ser. No. 271,050, Nov. 14, 1988, abandoned.

[51] Int. Cl.$^5$ .............................................. A22C 7/00
[52] U.S. Cl. ...................................... 452/37; 452/30; 452/39
[58] Field of Search ....................... 452/37, 39, 48, 49, 452/30, 41

[56] References Cited

U.S. PATENT DOCUMENTS

| | | |
|---|---|---|
| 3,975,795 | 8/1976 | Kupcikevicius et al. ............... 452/ |
| 4,017,941 | 4/1977 | Raudys et al. ............................ 452/ |
| 4,044,425 | 8/1977 | Nausedas ................................ 452/48 |
| 4,438,545 | 3/1984 | Kupcikevicius et al. ................ 452/ |
| 4,439,890 | 4/1984 | Kazaitis ................................... 452/ |
| 4,980,949 | 1/1991 | Stanley ................................... 452/37 |

Primary Examiner—Bruce M. Kisliuk
Assistant Examiner—Lawrence Cruz
Attorney, Agent, or Firm—Allegretti & Witcoff, Ltd.

[57] ABSTRACT

An improved mechanism controls gathering plates for an apparatus for the creation of filled tubing products. The plate comprise a longitudinally stationary pair of plates and a longitudinally movable pair of plates. The apparatus includes a cylinder, a piston and an adjustable stop. The cylinder is attached to the movable gaathering plates. The fixed piston rod extends within the cylinder and has a piston within the cylinder. The stop is for stopping movement of the cylinder relative to the piston under the action of fluid moved into the cylinder. The stop is mounted on the cylinder and is adjustable to provide for adjustment of the stopping position of the cylinder relative to the piston.

1 Claim, 2 Drawing Sheets

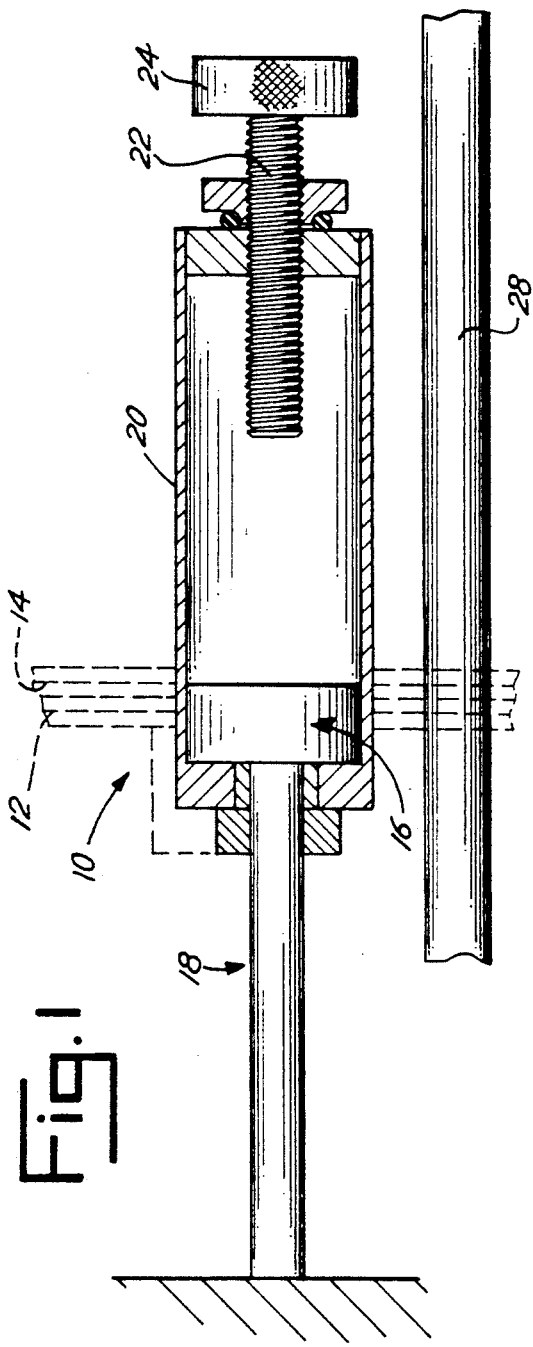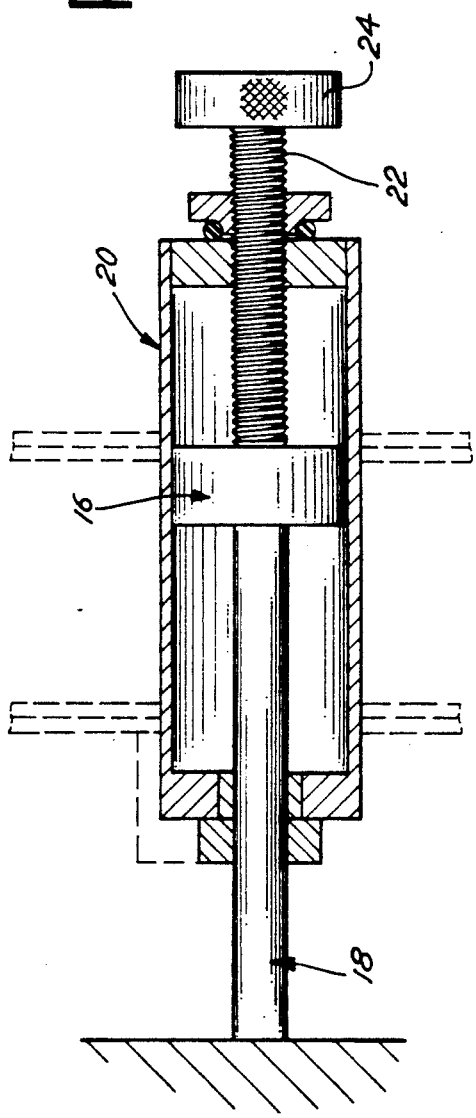

MECHANISM FOR CONTROL OF GATHERING PLATES FOR A DOUBLE CLIPPER APPARATUS

This application is a continuation of application Ser. No. 07/271,050, filed Nov. 14, 1988 now abandoned.

BACKGROUND OF THE INVENTION

This invention relates to machines for the creation of stuffed products, especially stuffed meat products, and more particularly, to high speed machinery in which stuffed products are formed of fill and tubing, where the fill is pumped into the tubing, and the filled tubing is intermittently clipped and severed to form products known as chubs.

In the creation of stuffed products, especially stuffed metal products, high speed machinery is employed in which stuffed products are formed of fill and tubing. The fill is pumped or otherwise placed into the tubing, and the filled tubing is intermittently clipped and severed to form products known as chubs. In machines as described, voider or gathering plates are included. The plates are paired, and move in pairs both transversely to the direction of product flow, and longitudinally along the direction of product flow.

The plates include longitudinally movable gathering plates, and stationary gathering plates. As conventional, the plates are operated in co-ordination with a clipper apparatus. The pairs of plates operate through a cycle as follows: The plates are open transversely, to allow product to pass through. The movable plates are adjacent the stationary plates.

Voiding of fill material from a region of tubing is a desired function, and under machine control, both pairs of plates move transversely to void fill from the tubing. The movable pair of plates, in the transversely closed position, then move longitudinally, to create a "tail" (a region of tubing substantially void of fill).

The clipper apparatus is activated to place clips between the pairs of plates. The tail is severed between the clips, to form the end of one product, and the beginning of the next.

In the past, products such as hams and turkeys, cooked, i loaf form, have been formed in the manner described, in a meat filled tubing which is thereafter molded. A concern of manufacture has been that the molds typically have length dimensions which are different in length than the pre-molded, filled tubing form of the product. In such a situation, the filled tubing form of the product must have a "tail" (a tubing portion which is unfilled) longer than required with a product which will not be molded. In typical machinery, tail length is not adjustable.

SUMMARY OF THE INVENTION

In a principal aspect, the present invention constitutes an improved mechanism for the control of gathering plates for an apparatus for the creation of filled tubing products. The plates comprise a longitudinally stationary pair of plates and a longitudinally movable pair of plates. The plates are operated in co-ordination with a clipper apparatus. The pairs of plates operate through a cycle, beginning with the plates being open transversely, to allow product to pass through. The movable plates are adjacent the stationary plates. Under machine control, both pairs of plates move transversely, to void fill from the tubing. Both pairs of plates are then transversely closed. The movable pair of plates, in the transversely closed position, then move longitudinally, to create a "tail" (a region of tubing substantially void of fill). The clipper apparatus is activated to place clips between the pairs of plates. The tail is severed between the clips, to form the end of one product, and the beginning of the next.

In association with plates as described, the mechanism of the present invention includes a cylinder, a piston and an adjustable stop, The cylinder is attached to the movable gathering plates. The fixed piston rod extends within the cylinder and has a piston within the cylinder. The stop is for stopping movement of the cylinder relative to the piston under the action of fluid moved into the cylinder. The stop is mounted on the cylinder and is adjustable to provide for adjustment of the stopping position of the cylinder relative to the piston.

In a preferred form of the invention, an assembly according to the invention includes a piston, piston rod, cylinder and stop. The piston rod has an end fixed by attachment to the machine. The rod extends axially parallel to the direction of product flow, i.e., longitudinally. The piston is mounted at the free end of the piston rod. The piston rod extends into the cylinder, and the piston is located within the cylinder. The piston and cylinder diameters are sized for sliding movement of the cylinder and piston relative to each other. Various seals are included such that the cylinder contains fluid.

Fluid is pumped into the cylinder, or removed from the cylinder, on command, to move the cylinder relative to the piston, and thereby relative to the clipper and other associated machinery. The cylinder is attached to the movable plates, and drives the movable plates longitudinally. The stationary plates lie along the length of the cylinder, but are not attached thereto. As conventional, the plates are moved transversely by a separate mechanism, including a rod. The extent of movement of the movable plates in one longitudinal direction is determined by contact of the piston against the end of the cylinder facing the fixed end of the piston rod. In this position of the piston and cylinder, the movable plates are adjacent the stationary plates. The extent of movement of the movable plates is determined in the opposite longitudinal direction by contact of the piston against the adjustable stop.

The apparatus of the present invention has the advantages of speedy, manual and infinite adjustment, and elegant simplicity.

BRIEF DESCRIPTION OF THE DRAWING

FIG. 1 is a cross-sectional view of a preferred form of the apparatus of the invention; and FIG. 2 is an additional cross-sectional view of the preferred embodiment.

DETAILED DESCRIPTION OF THE PREFERRED EMBODIMENT

Figure 3:
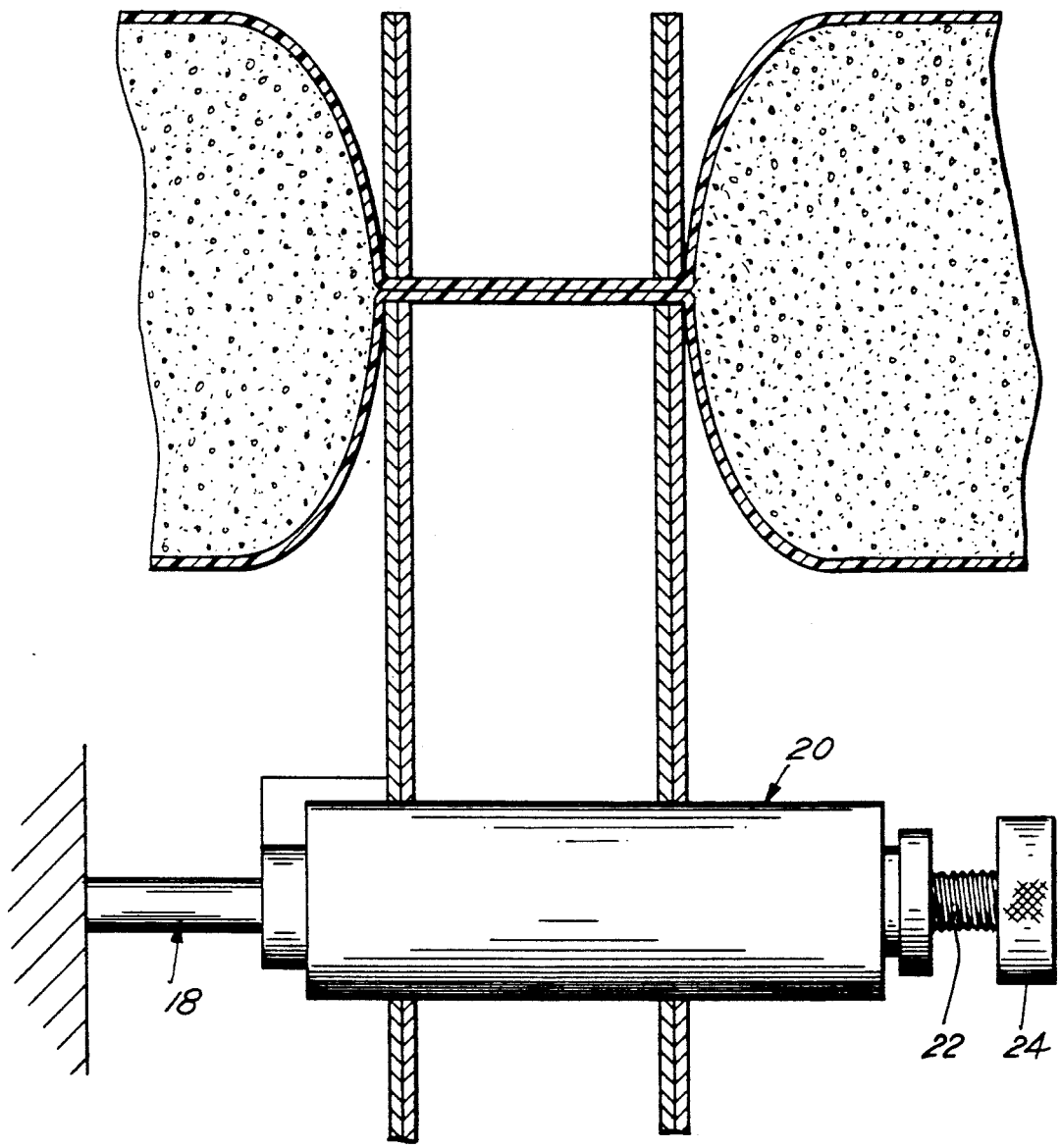
FIG. 3 is an elevation view of the preferred embodiment, with the voider plates which accompany the preferred embodiment shown diagrammatically as forming a tail, as disclosed in the Detailed Description Of The Preferred Embodiment.

Referring to FIG. 1, the preferred form of the invention is a piston, cylinder, and stop assembly 10. The machine in which the preferred assembly 10 is located includes a pair of longitudinally movable gathering plates 12, and a pair of stationary gathering plates 14. As conventional, the plates are operated in co-ordination with a clipper apparatus (not shown). The pairs operate through a cycle as follows: The plates are open transversely, to allow product to pass through. The movable plates are adjacent the stationary plates. Voiding of fill material from a region of tubing is desired, and under machine control, both pairs of plates move transversely to void fill from the tubing. The movable pair of plates, in the transversely closed position, then move longitudinally, to create a "tail" (region of tubing substantially void of fill). The clipper apparatus is activated to place clips between the pairs of plates. The tail is severed between the clips, to form the end of one product, and the beginning of the next.

In such a machine, the assembly 10 includes a piston 16, piston rod 18, cylinder 20 and stop 22. The piston rod has an end fixed by attachment to the machine. The rod extends axially parallel to the direction of product flow, i.e., longitudinally. The piston is mounted at the free end of the piston rod. The piston rod extends into the cylinder, and the piston is located within the cylinder. The piston and cylinder diameters are sized for sliding movement of the cylinder and piston relative to each other. Various seals are included such that the cylinder contains fluid.

Fluid is pumped into the cylinder, or removed from the cylinder, on command, to move the cylinder relative to the piston, and thereby relative to the clipper and other associated machinery. The cylinder is attached to the movable plates, and drives the movable plates longitudinally. The stationary plates lie along the length of the cylinder, but are not attached thereto. As conventional, the plates are moved transversely by a separate mechanism, including a rod 28. The extent of movement of the movable plates in one longitudinal direction is determined by contact of the piston against the end of the cylinder facing the fixed end of the piston rod (as depicted in FIG. 1). In this position of the piston and cylinder, the movable plates are adjacent the stationary plates. The extent of movement of the movable plates is determined in the opposite longitudinally direction by contact of the piston against the adjustable stop (as depicted in FIG. 2). As now clear to the reader, the adjustable stop is mounted to the cylinder on the end of the cylinder away from the fixed end of the piston rod, and is adjustable relative to the cylinder to extend variable distances into the cylinder. An external knob 24 provides for manual adjustment of the distance which the stop extends into the cylinder, and thereby adjustment as desired to suit the length of tail needed for any specific product. The stop and cylinder include co-operating screw threads, such that adjustment is infinitely variable.

What is claimed is:

1. An improved mechanism for the control of gathering plates for a clipper apparatus, the plates comprising a longitudinally fixed pair of plates and a longitudinally movable pair of plates, comprising:
   a cylinder attached to the movable gathering plates for movement with the movable gathering plates in a direction defined as the longitudinal direction;
   a fixed piston rod extending within the cylinder and having a fixed piston within the cylinder; and
   a stop for stopping movement of the cylinder relative to the piston under the action of fluid moved into the cylinder, the stop being mounted on and movable in the longitudinal direction with the cylinder and extending into the cylinder in the longitudinal direction and being adjustable in the longitudinal direction relative to the cylinder to provide for adjustment of the stopping position of the cylinder relative to the piston in the longitudinal direction.

* * * * *